US008135443B2

(12) United States Patent
Aleksic et al.

(10) Patent No.: US 8,135,443 B2
(45) Date of Patent: Mar. 13, 2012

(54) PORTABLE DEVICE WITH PRIORITY BASED POWER SAVINGS CONTROL AND METHOD THEREOF

(75) Inventors: Milivoje Aleksic, Richmond Hill (CA); Aris Balatsos, Toronto (CA); Kevin O'Neil, Toronto (CA); James L. Esliger, Richmond Hill (CA); Bruce Plotnick, Furlong, PA (US)

(73) Assignee: QUALCOMM Incorporated, San Diego, CA (US)

( * ) Notice: Subject to any disclaimer, the term of this patent is extended or adjusted under 35 U.S.C. 154(b) by 1051 days.

(21) Appl. No.: 11/469,141

(22) Filed: Aug. 31, 2006

(65) Prior Publication Data

US 2008/0057894 A1 Mar. 6, 2008

(51) Int. Cl.
*H04M 1/00* (2006.01)
(52) U.S. Cl. ......... 455/574; 455/572; 375/219; 320/120
(58) Field of Classification Search .................. 455/574, 455/572; 375/219; 320/120
See application file for complete search history.

(56) References Cited

U.S. PATENT DOCUMENTS

| | | | |
|---|---|---|---|
| 6,215,275 B1 | 4/2001 | Bean | |
| 6,236,674 B1 * | 5/2001 | Morelli et al. | 375/219 |
| 6,263,200 B1 * | 7/2001 | Fujimoto | 455/343.5 |
| 6,363,266 B1 | 3/2002 | Nonogaki | |
| 7,336,929 B2 * | 2/2008 | Yasuda et al. | 455/41.2 |
| 2004/0141528 A1 | 7/2004 | LeBlanc et al. | |
| 2004/0266493 A1 * | 12/2004 | Bahl et al. | 455/574 |
| 2005/0070339 A1 | 3/2005 | Kim | |
| 2005/0085277 A1 * | 4/2005 | Chen et al. | 455/572 |
| 2006/0279256 A1 * | 12/2006 | Bletsas | 320/128 |

FOREIGN PATENT DOCUMENTS

| | | |
|---|---|---|
| CN | 1679218 | 10/2005 |
| EP | 1524829 A | 4/2005 |
| EP | 1594232 A | 11/2005 |
| FR | 2857195 A | 1/2005 |
| JP | 10290195 A | 10/1998 |
| JP | 2000253142 A | 9/2000 |
| JP | 2000253587 A | 9/2000 |
| JP | 2000357987 A | 12/2000 |

(Continued)

OTHER PUBLICATIONS

International Search Report and Written Opinion dated Jun. 4, 2008 for PCT Application No. PCT/US2007/077125, pp. 1-17.

(Continued)

*Primary Examiner* — Charles Shedrick
(74) *Attorney, Agent, or Firm* — Elaine Lo

(57) ABSTRACT

A portable device includes a controller that is responsive to a remaining power capacity of the battery, and a power consumption level of the portable device and based on user prioritized functional processing capability features, dynamically controls functional processing capability features of the device. The controller provides power for a higher priority feature at the expense of a lower priority functional processing capability feature consistent with the user prioritized functional processing capability features. A wireless portable device is also disclosed that includes a wireless signal strength determinator that determines a received signal strength of the wireless device and a controller that adjusts the functional processing capability feature of the wireless device based on the determined received signal strength and based on battery capacity information. In this way, received signal strength information is used as a further input to determine how to best adjust functional processing capability features of the device.

42 Claims, 11 Drawing Sheets

FOREIGN PATENT DOCUMENTS

| | | |
|---|---|---|
| JP | 2001136679 A | 5/2001 |
| JP | 2001274898 A | 10/2001 |
| JP | 2001352394 A | 12/2001 |
| JP | 2002199062 A | 7/2002 |
| JP | 2005117304 A | 4/2005 |
| JP | 2006050510 A | 2/2006 |
| WO | WO 00/39908 A | 7/2000 |
| WO | WO 2004/105417 A | 12/2004 |
| WO | WO 2005/009062 A | 1/2005 |

OTHER PUBLICATIONS

Translation of Office Action in Chinese application 200780037743.4 corresponding to U.S. Appl. No. 11/469,141, citing CN1679218 and US6236674 dated Feb. 23, 2011.

* cited by examiner

| Priority | 1 | 2 | 3 | 4 | 5 | Applications |
|---|---|---|---|---|---|---|
|  | ● | ○ | ○ | ○ | ○ | Settings |
|  | ● | ○ | ○ | ○ | ○ | Telephone |
|  | ● | ○ | ○ | ○ | ○ | Paging |
|  | ○ | ● | ○ | ○ | ○ | Email |
|  | ○ | ● | ○ | ○ | ○ | Text Messaging |
|  | ○ | ○ | ● | ○ | ○ | Internet Browser |
|  | ○ | ○ | ● | ○ | ○ | Games |
|  | ○ | ○ | ○ | ● | ○ | MP3 Player |
|  | ○ | ○ | ○ | ○ | ● | Mobile TV |

1300

US 8,135,443 B2

PORTABLE DEVICE WITH PRIORITY BASED POWER SAVINGS CONTROL AND METHOD THEREOF

FIELD OF THE DISCLOSURE

The disclosure relates generally to devices having batteries, and more particularly to battery powered devices that employ power saving management operations.

BACKGROUND OF THE DISCLOSURE

Portable devices, such as digital audio and/or video players, cell phones, cameras, camcorders, or any other suitable portable devices, have limited battery capacity. In the case of a wireless cell phone device, the device can also operate in environments with differing network signal strengths. When the capacity of a battery drops below a threshold, known portable devices can operate in a low battery condition and reduce power consumption such as by, for example, dimming displays. In addition, low battery power modes can result in the shutting down of certain features of the device at varying levels of operation. For example, integrated circuits are known to go into low power states when a battery level has reached a low battery threshold level. Clock frequencies to certain functional blocks within the integrated circuit or the entire integrated circuit may be put in a low power mode. This may be carried out, for example, by varying clock frequencies to various circuits and lowering supply voltages to various internal circuits to an integrated circuit, such as an application specific integrated circuit, general purpose processor, baseband processor or any other circuit as desired. However, users are typically most concerned with the amount of play time of a digital audio or video playing device or the talk time remaining of a cell phone for the ability to use the portable device for at least an emergency call. However, in areas with low network signal strength, it may take more units of battery capacity per unit of talk time to provide suitable communication levels. Accordingly, having functional blocks or circuits "power down" in a low battery level condition may be too late when the wireless telephone is in a low signal strength environment since there may not be enough battery capacity to transmit at a high enough level with a base station or other wireless device.

In addition, portable devices are known that have many different software applications and features, such as the ability to play games, play digital media, have cameras, camcorder functionality, email applications, voice communication capabilities, and other features. However, each feature can consume differing amounts of power and may have a different metric that is important for the given application or feature. For example, when playing a game on a portable device, the amount of time to play the game may be an important metric to a user and for digital audio playing device, the amount of time that a song(s) can be listened to may be an important metric, the amount of talk time may be important for a voice communication feature in a cell phone and the number or size of emails that can be received may be relevant for an email feature. Known devices may allow a user to set a threshold of remaining battery capacity so that when the battery capacity reaches the minimum level set, certain power reduction operations take place in an effort to save battery power. However, some users may be more concerned with the available features and less concerned with the battery condition.

Therefore, a need exists for an improved power management operation in portable devices and/or portable wireless devices.

BRIEF DESCRIPTION OF THE DRAWINGS

The invention will be more readily understood in view of the following description when accompanied by the figures below and wherein like reference numerals represent like elements.

DETAILED DESCRIPTION OF THE DISCLOSURE

Figure 1:
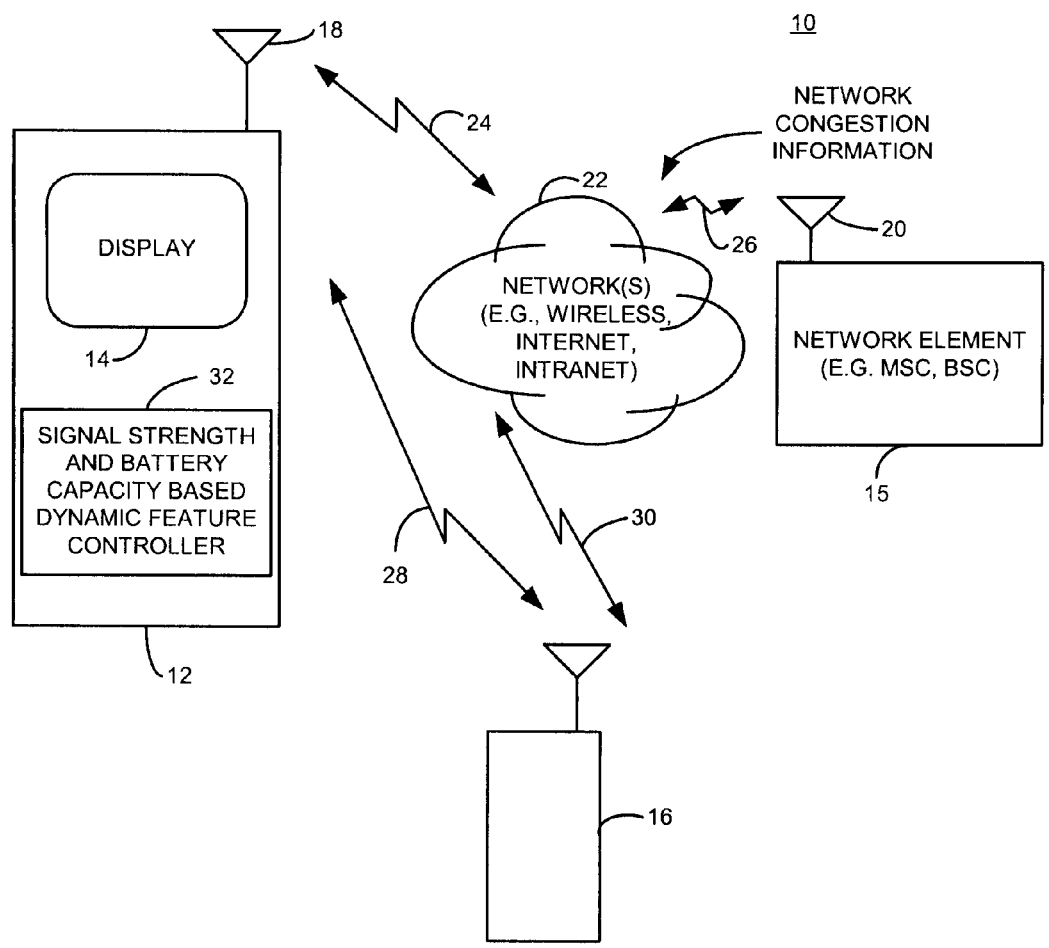
FIG. 1 is a block diagram illustrating one example of a system employing a wireless portable device in accordance with one embodiment of the invention.

Briefly, in one embodiment, a portable device includes a controller that dynamically controls functional processing capability features of the device to provide power for a higher priority feature at the expense of a lower priority functional processing capability feature consistent with the data representing user prioritized functional processing capability features. The controller dynamically controls functional processing capabilities based on a remaining power capacity of a battery, and a power consumption level of the portable device and the user prioritized functional processing capability features. As such, a user can prioritize which functional processing capability features of the portable device take priority over others and the controller will take into account the battery capacity and power consumption rate and provide the highest priority feature in view of this information.

For example, based on a user's desired need for a specific amount of talk time if, for example, the user has prioritized the voice feature of the device, the controller calculates the power consumption that would be used by the voice feature based on the assessment, and the controller turns those features off as required to meet the talk time level set by the user. The controlling of the features may also take into account, for example, received signal strength indication (RSSI) if desired, or other information if desired. Stored control data, such as a lookup table that indicates which parametric settings can be controlled for the device may be employed to suitably turn on and off features or otherwise adjust functional processing capability features of the device to provide power for the higher priority feature at the expense of a lower priority functional processing capability feature.

In one example, a wireless portable device is also disclosed that includes a wireless signal strength determinator that determines a received signal strength of the wireless device and a controller that adjusts the functional processing capability feature of the wireless device based on the determined received signal strength and based on battery capacity information. Received signal strength is typically a quality metric for a communication "channel". However, as used herein it can refer to any type of quality metric of any channel that may be applicable to a wireless device, such as a "voice-recognition channel" with varying levels of power usage dependent on ambient noise levels, or a "data storage channel" where different streams may consume more or less power depending on the data rate that must be output to the channel, and based on the fragmentation state of the media. In this way, received signal strength information is used as a further input to determine how to best adjust functional processing capability features of the device. If desired, the portable device can also take into account network congestion information and adjust functional processing capability feature of the portable device based on the received signal strength, battery capacity information and network congestion information. A controller may be operative to determine an amount of power that will be used during the use of a given feature and the controller may also enter an emergency call mode prior to an out-of-power condition, to preserve power for an emergency call in the instance where the portable device employs cell phone technology, for example. As such, the controller may be operative to determine an amount of power that will be used to provide a functional processing capability feature and to reduce processing capability features to preserve power for an emergency call.

In addition, if desired, the portable device may also determine a power usage rate of the device based on current operational conditions of the device and predict an amount of time that an application can continue to run, such as a game, or any other suitable application, based on the power usage rate. The portable device may determine whether a desired application quality of service level can be maintained for a desired application run-time length and if so, adjust power consumption of the device or adjust a quality of service level provided by the application, in an attempt to meet the desired application run-time. This may include shutting down the application to maintain a minimum battery power energy reserve so that the device may be used for emergency purposes or to run other higher priority applications. Quality of service of an application may include, for example, the image resolution level that is output by the application to a display for a game or for outputting video at a certain rate from a suitable video source such as memory or any other suitable aspect. As such, the application may continue to run, but may be controlled so that the processor executing the application and/or circuits used by the application output information at a different quality level as experienced, for example, by a user.

FIG. 1 illustrates one example of a system 10 that employs a portable device 12, in this case a wireless portable device, that communicates through suitable network communications with one or more network elements 14 and other portable devices 16, if desired. For purposes of illustration only and not limitation, the system will be described as a wireless communication system, such as a wireless cellular communication system that can communicate with web servers, if desired, but may be any other suitable communication network or combination of communication networks as desired. In addition, the portable device 12 will be described, in this example, as a wireless portable device such as, but not limited to, a wireless cell phone with any suitable features, a wireless digital audio and/or video player, a laptop computing device, an email communication device, or any other suitable portable device that utilizes, for example, a battery. For purposes of illustration only, the portable device 12 will be described herein as a cell phone having suitable features such as voice communication features using known cell phone communication circuits, camera features, digital audio storage and playback features, video storage and playback features, email features, and any other suitable features as desired.

As shown, the portable device 12 includes a display 14 and an antenna 18 for wirelessly communicating with the wireless network element 15, such as a base station, base site controller, or any other suitable network element. The network element 15 may be, for example, a server or group of servers that, as known in the art, employ one or more processors and associated memory and any suitable interfaces or circuits to communicate the information described herein. Although the network element 15 is shown as having an antenna 20 it will be understood that the network element 15 may be a group of elements that communicate with one another and that the antenna 20 may be part of a base station, for example, and another part of the network element 15 may be a server or circuit in operative communication with the base station where the base station can wirelessly communicate information as described herein. The portable device 12 communicates with a network 22 via a wireless communication link 24, as known in the art. The network 22 may include one or more wireless networks including wireless wide area networks, wireless local area networks, the Internet, intranets, or any other suitable network or networks. The portable device 16 for purposes of illustration only, will be referred to as a same type of portable device 12 that may communicate via a link 28 either directly with portable device 12 via, for example, a short range wireless communication link such as a Bluetooth or any other suitable link and may also utilize a wireless wide area network link 30 to communicate with the network 22 or any other suitable device or devices. However, any suitable communication technique may be employed.

The portable device 12, in this example a wireless portable device, includes a controller 32 that is operative to adjust a functional processing capability feature of the portable device 12 based on a determined received signal strength and battery capacity information. As such, it serves as a type of signal strength and battery capacity based dynamic feature controller. A functional processing capability feature may include a device feature wherein processing of data occurs and the processing of data can be adjusted. For example, a functional processing capability feature may include a user perceptible feature that is based on the execution of software application (e.g., any executable code such as, but not limited to, applets or executable code in any form) where the control of circuits that effect the processing of data. Accordingly, functional processing capability features may be, for example, an email feature, a game playing feature, a video playback feature, an audio playback feature, an audio recording feature, voice communication feature, the quality of service provided to a user by a particular application, or any other suitable functional processing capability feature. As to the quality of service, an application for example, can be controlled to provide higher quality features for a user or low quality features for a user. For example, in the context of a 3D game, the application is controlled as described herein, for example, to perhaps render in a higher resolution mode or use fewer primitives to represent objects depending upon user priority settings and battery capacity and/or received signal strength indication information. Another example may be for a video playback feature, reducing the quality of resolution output or frame rate for the display. In one example, the controller 32 adjusts the functional processing capability features of the device by controlling, at an application level, operation of an application operating on the device based on a determined signal strength and battery capacity level of the device. An application may be, for example, a software module or modules executing on one or more processors such as, but not limited to, CPU cores, DSP cores, graphics processing cores or other processors. The controller 32 may be implemented, for example, as a processor executing one or more suitable software modules that cause the processor or processors to carry out the operations described herein. Alternatively, the controller 32 may be implemented as discrete logic in the form of an application specific integrated circuit, or state machines or any other suitable structure or may be implemented by any suitable combination of hardware, software, and firmware as known in the art.

Figure 2:
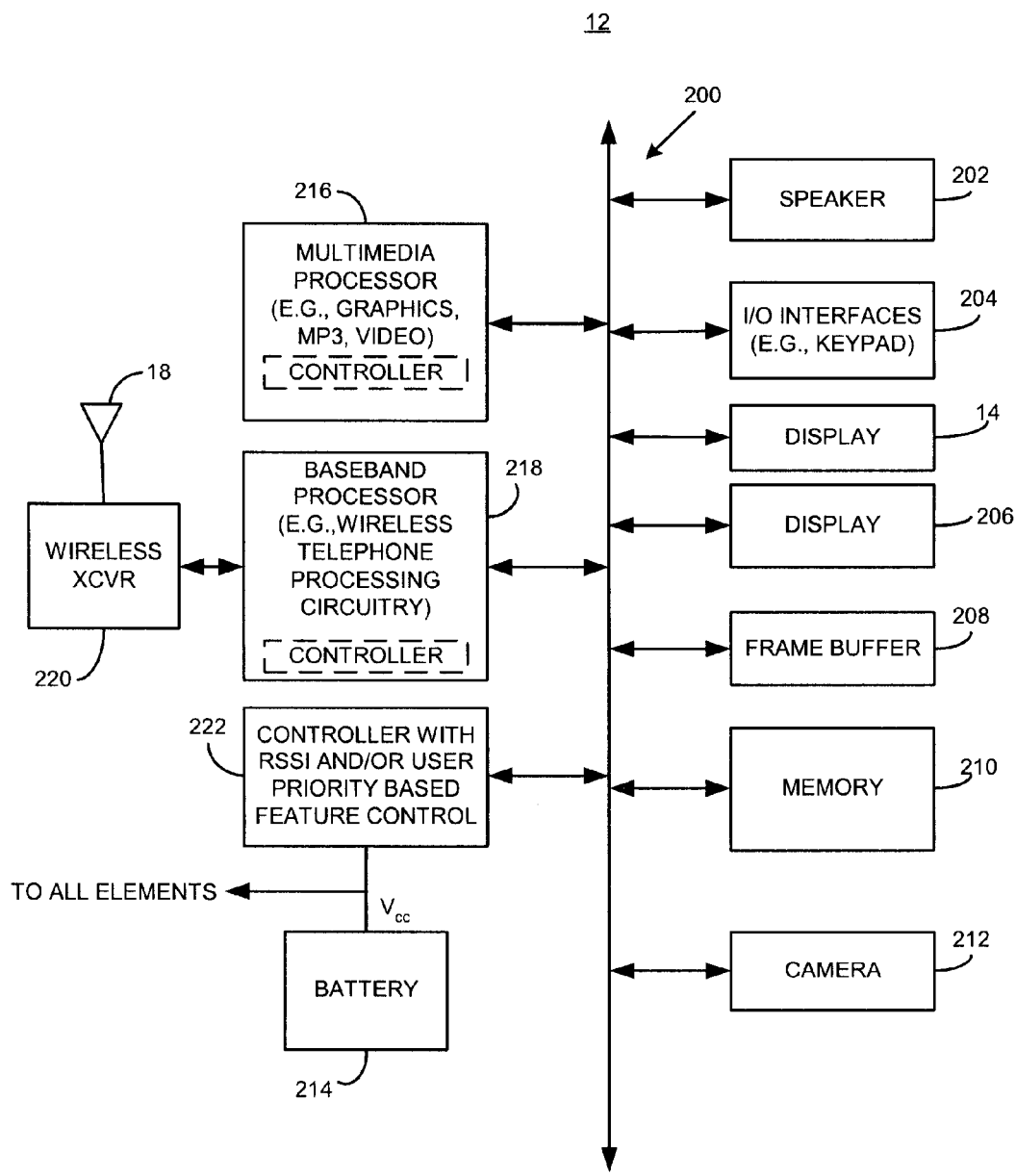
FIG. 2 is a block diagram illustrating one example of a portable device in accordance with one embodiment of the invention.

FIG. 2 illustrates in block diagram of one example of the portable device 12, such as a wireless handset device, such as a cell phone or any other suitable device as noted above. As shown, the device 12 may include a communication structure 200 that may include a plurality of buses or other interconnections as desired to allow the various blocks to communicate with one another. The portable device 12, in this example, includes one or more speakers 202, input/output interfaces 204, such as keypads, graphic user interfaces, or any other suitable interfaces, one or more displays, one or more frame buffers 208, memory 210, a camera 212, a battery 214, a multimedia processor 216, a baseband processor 218, a wireless transceiver 220 and the controller 32.

The multimedia processor 216 may be, for example, a multimedia core that is separate from or integrated with the baseband processor 218 or controller 32 as desired. It will be recognized that the functional blocks illustrated in FIG. 2 may be incorporated as any suitable structure, such as one or more integrated circuits or other structures as known in the art. The multimedia processor 216 may be, for example, a graphics processing core in combination with audio and video processing circuitry to allow the generation of graphics and/or video for display on one or more displays 14 and 206 and employs the frame buffer 208 to store intermediate data and final data for display as known in the art. As shown, the controller 32 may be incorporated in the multimedia processor or baseband processor or may be a stand alone integrated circuit if desired. The baseband processor 218, as known in the art, suitably processes received signals or signals to be transmitted via wireless transceiver 220 and may include, for example, any necessary wireless telephone processing circuitry to process voice or circuitry to process data information that is received or sent via the wireless transceiver 220. The battery 214 is operatively coupled to the various elements to supply power when the device is operated in a battery mode. As used herein, a battery can include any suitable structure that has a limited power capacity. For example, the battery 214 may be a charged capacitor, fuel cell, lithium based power source or any suitable portable limited power source and may include one or more limited capacity power sources, such as a plurality of discrete power sources that are electrically coupled together, or may take any suitable form as known in the art.

The frame buffer 208 may be employed in memory 210 or other memory and may take any suitable form and may be included, for example, in the multimedia processor 216 or as part of any other module as desired. The frame buffer 208 and memory 210 may take any suitable form including, but not limited to, ROM, RAM, optical storage structures, or any suitable digital storage medium. The memory 210, or any other suitable memory, may contain the executable instructions that when executed cause the controller or any processing device to operate as indicated herein. It will be recognized that the blocks shown in the figure are meant to show functional blocks and may be suitably incorporated and combined as desired. As such, the memory may include suitable registers or the processors may include the registers or any suitable structure may be used as understood in the art. As known in the art, the camera 212 may be any suitable image providing circuit including a camcorder or any other suitable structure that provides an image to, for example, the multimedia processor 216 for processing and display on one or more displays 14 and 206 as known in the art. It will be recognized that the functional blocks shown in FIG. 2 are merely examples and that any suitable functions may be employed in a portable device as known in the art. Also, the controller need not utilize RSSI information, but instead, or in combination, may incorporate user priority settings to control the functional processing capability features of the device. It may also use RSSI information in addition to user priority information and battery capacity information as noted above.

Figures 3, 8:
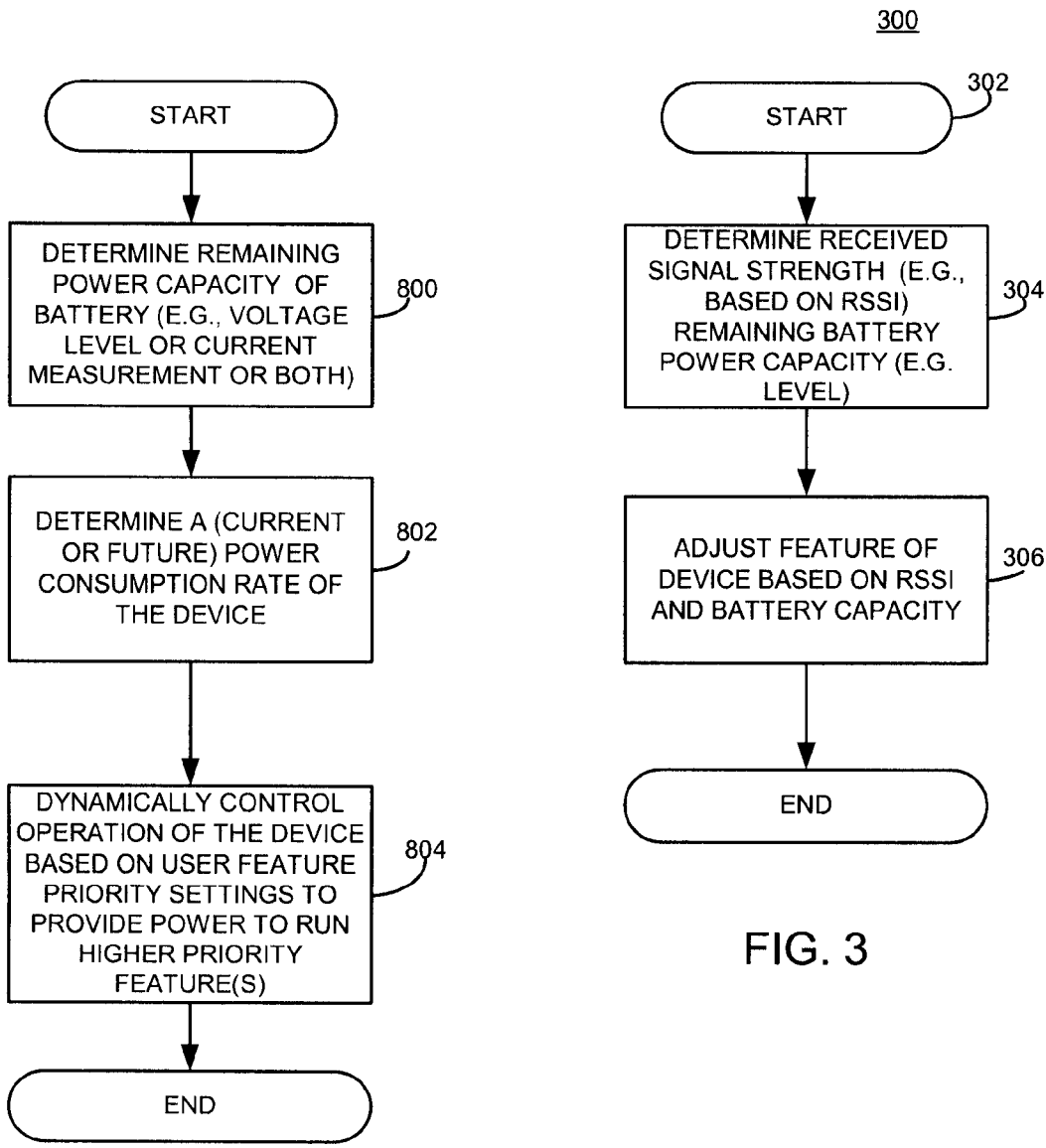
FIG. 3 is a flowchart illustrating one example of a method for dynamically controlling a functional processing capability feature of a portable device in accordance with one embodiment of the invention.
FIG. 8 is a flowchart illustrating one example of an application power level adjustment scheme in accordance with one embodiment of the invention.

FIG. 3 illustrates one example of a method for dynamically controlling a functional processing capability feature of the portable device that may be implemented using one or more of the blocks shown in FIG. 2. In addition, any other suitable element including a network element 15 remote from the device 12 may perform the operations. It will also be recognized that the order of operations of the methods described herein may be suitably changed as recognized by one of ordinary skill in the art depending upon a desired outcome. As shown, the method starts in block 302 when the wireless portable device has power and is in an "on" state. In block 304, the method includes determining a received signal strength for the portable device. This may be done, for example, by a received signal strength determinator, as known in the art, which may be part of the wireless transceiver 220 or any other suitable logic that determines a received signal strength by the portable device and may be in the form of received signal strength indication (RSSI) which may be determined either by processing received signals or receiving a value indicating the signal strength from an external device such as another mobile device or from the network if desired. Based on the received signal strength information, the method includes, as shown in block 306, adjusting a functional processing capability feature of the portable device and based on battery capacity information. The battery capacity information may be obtained, for example, by the controller 32 or from any other suitable battery capacity detection or determination circuit or may be stored in a register or any other memory location. The battery capacity information may be, for example, information representing how much remaining power is available from the battery at a given point in time. The battery capacity information may also include information indicating the capacity in terms of the amount of energy (E.G., joules of energy) available from the battery. This can be represented in any suitable manner such as power per time such as a number of microwatts that are available per unit time given a current or expected operating load of the device, or it may simply be the number of ampere-hours which would be independent of any current or expected load on the device, or other suitable representation. The effective energy from a battery is usually not a linear function of time or load, so this data can be looked up through a table, or queried from the battery itself (for "smart" batteries).

Adjusting functional processing capability feature of the device may be performed, for example, by the controller 32 or any other suitable element and may include, for example, selecting which software application will operate on the device based on the determined received signal strength and battery capacity information. For example, a phone or voice application may be given priority over an email application and as such, the email application may be shut down or limited to receiving only emails from specific designated senders as set, for example, through a graphic user interface. This may require some communication with a server to ensure that the server held back any e-mail from senders not on the current list of acceptable senders. The priority based functional processing capability feature control acts, for example, to shut down if desired, lower priority applications to allow enough battery capacity to operate the primary or higher priority applications.

Alternatively, functional processing capability features of the device may be adjusted at an application level so that a given application is controlled so that it provides a different quality of service to the user based on the determined received signal strength and battery capacity information. Examples of such operations are also provided below.

Figure 4:
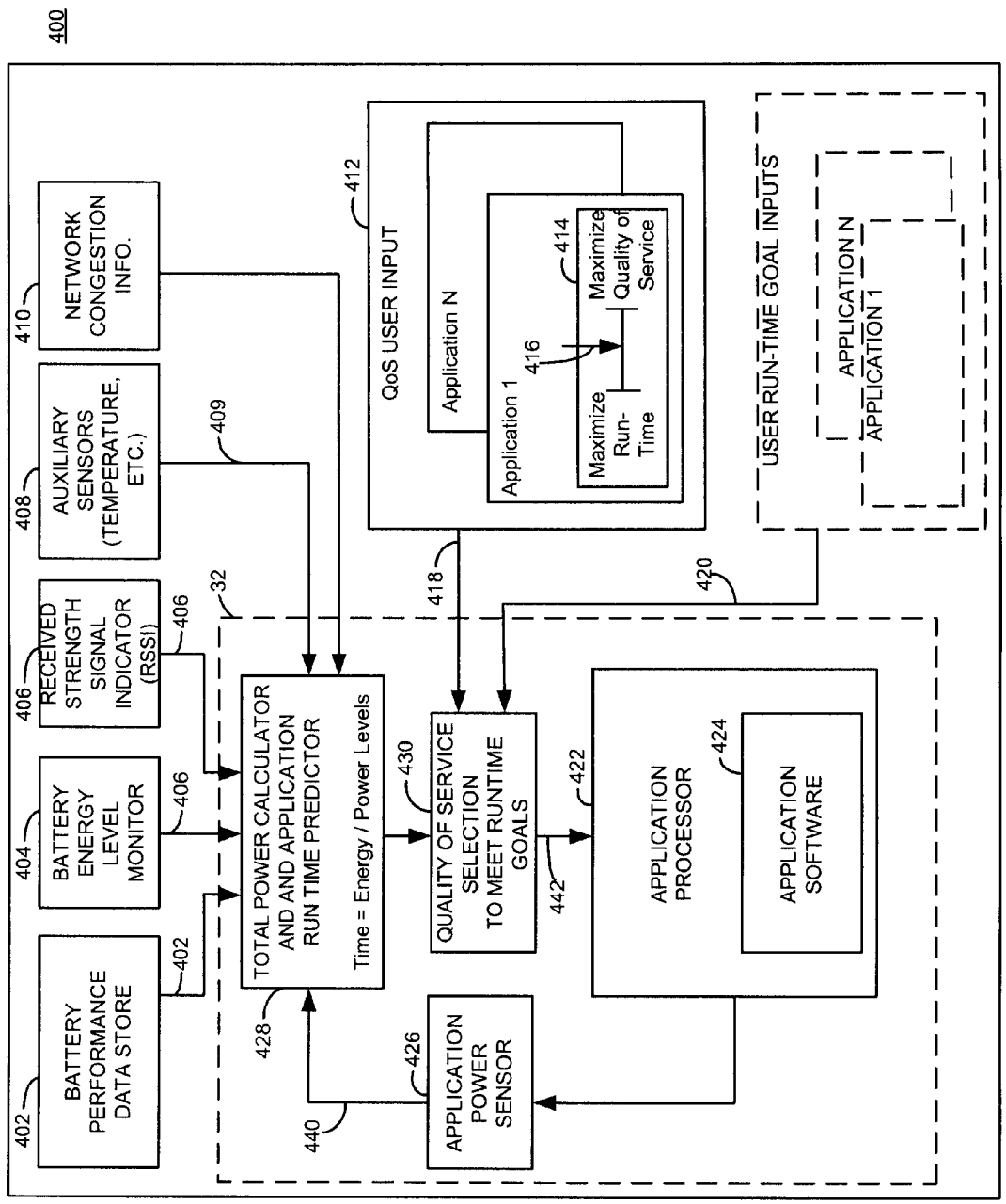
FIG. 4 is a block diagram illustrating one example of a portion of a portable device in accordance with one embodiment of the invention.

FIG. 4 is a block diagram illustrating the controller 32 as an application level power management system 400. The system may be within the portable device 12 and in this example, includes memory containing battery performance data 402. The battery performance data 402 may be historical data of the capacity consumed by a particular application using particular operating parameters (e.g., processor clock and voltage settings, RSSI, other applications running) for a relevant unit (e.g., per unit of talk time). In this example, the battery performance data would be a array of data with multiple entries that could be pre-populated and then updated over time with actual usage information. The manufacturer can provide this information as well (e.g., performance vs. loading and versus battery age). The system then keeps track of loading levels and battery age. The battery performance degrades over time, and battery management systems (e.g., in laptop computers) keep track of how often a battery is discharged and charged, and maintain an updated amp*hours (or capacity) rating. Table 402 can contain data allowing the device to predict battery energy capacity for different power consumption levels (i.e. for different current or power draw levels) across different temperatures and for different wear levels of the batteries (note that maximum stored charge typically drops after multiple charge/discharge cycles since many batteries are in fact consumables with limited lifetime—e.g. 2 years). These battery tables can generally be pre-computed (e.g. manufacturer tables). The application power sensor 426 can be used to measure application power, or this can be inferred by the derivative (rate of change over time) of the battery energy level 406, so application power levels need not be stored in the table. It can also hold data indicating how much power different applications/services would consume, in various configurations of those apps/services.

The device may include a battery energy level monitor 404, memory containing received signal strength information 406, auxiliary sensors such as temperature sensors 408 that provide temperature information 409 to the controller 32 and memory containing network congestion information 410. A graphic user interface 412 is shown which allows a user to select on a per application basis for example, whether the controller should control features to allow the maximum application runtime that the user desires or a maximum quality of service that the application provides or any suitable level therebetween. The graphic 414 presented on a display provides selectable application runtime information 416 within a range of the controller either providing a maximum quality of service level by the application or a maximum application run length time. The desired application quality of service information is selected by the user and shown as information 418 and is provided to the controller. Alternatively, the user specified runtime length for each application may be provided as shown as data 420 as selected through a suitable graphic user interface or other suitable interface. In this example, the controller 32 is a suitably programmed processor or set of processors that include, for example, an application processing portion 422 that executes the application software 424 such as a game, an email application, voice application, digital audio playback application, camera application, or any other suitable code used in conjunction with a feature selectable by the user. The controller also includes an application power sensor module 426 that may be for example, software executed by the controller in addition to a total power calculator and application runtime predictor module 428 and quality of service selector 430 both of which may be implemented as software modules executed by the controller 32.

The battery performance data 402 can be data, for example, prestored in memory for the given battery that is present in the portable device. The battery performance data 402 may be provided, for example, by a battery manufacturer or from any other suitable source and indicates for the particular battery type, and at a given voltage level, the amount of power that the battery can provide. The battery energy level monitor 404 monitors the present voltage level and provides a current battery level 406 which may then be used by the total power calculator and application runtime predictor 428 to determine how much battery capacity the battery can currently provide by, for example, using the battery level 406 to look up the corresponding power that the battery can provide. It will be recognized, however, that any other suitable technique may be used to determine the battery capacity information. The received signal strength information 406 may be used to determine how to control various applications or functional processing capability features as further described below. The application power sensor 426 may be, for example, a current sense circuit or voltage sense circuit for the application processor 422 to determine how much power is being consumed when executing the application software 424. The application power usage information 440 is also provided to the total power calculator and application runtime predictor 428. The total power calculator and application runtime predictor 428 determines the amount of time, for example, that the current application 424 can be run at its current level based on the current amount of power usage 440, and the battery capacity information. The total power calculator and application runtime predictor then predicts, for example, the runtime length of the application (functional processing capability features provided by the application) and selects a suitable quality of service to meet the runtime goal information 418 set by the user. The quality of service selection then determines whether the application processor 422 needs to dynamically control the processing by the application processor of the application software 424 by providing, for example, setting information 442 for the application processor. The received signal strength indicator 406 serves as a wireless signal strength determinator that determines a received signal strength of the portable device. The auxiliary sensor information 409 may be used to better predict remaining battery capacity. For example, if the temperature of the device or controller is high, more leakage and more power consumption may occur.

The total power calculator and application runtime predictor 428 serves as a battery capacity determinator and generates battery capacity information for use in determining the estimated runtime that can be provided by the current battery capacity. In one embodiment, the controller 32 adjusts the functional processing capability features of the portable device by selecting which application will operate on the device based on the determined received signal strength and battery capacity information. For example, when a low signal strength is detected, the controller 32 may increase power consumption by increasing the transmit power of the wireless transceiver 220 and may also shut off applications or control, at an application level, the operation of an application to reduce the power consumed by one or more applications. The total power calculator and application runtime predictor estimates how much power will be used under a given operating condition.

In the example where the graphic user interface 412 provides, for example, a bar graph or other suitable graphic user interface to allow a user to set a talk time threshold, the user may set, for example, a minimum fifteen minute talk time threshold for an emergency call mode, for example. The controller 32 sets the functional processing capability feature based on the user settable talk time threshold by, for example, shutting down all currently operating applications if the remaining battery capacity threshold is reached in order to preserve the desired talk time designated by the settable talk time threshold. The controller 32 leaves "on" the circuitry and other applications associated with the voice communication to facilitate the voice operation, but may shut down or otherwise lower power consumption with all other operations. This may enable a user to set a minimum emergency call time period by refraining from running other applications (e.g., operate in its camera mode, allow music to be played back, etc.) when the reserve threshold time is met. When the reserved power level is reserved for an emergency call, the controller 32 determines an estimate of the amount of power (e.g., battery capacity) that will be used to provide the functional processing capability feature that is selected by the user and reduces the other processing capability features to preserve power for an emergency call. An emergency call may be a call, for example, that is a 911 call. The device is controlled to reserve an emergency call power level and shuts down other applications that if left to run, would reduce the battery power to a point where an emergency call could not be carried out or an important call would not be received (such as from a designated sender such as a spouse or child).

Figure 5:
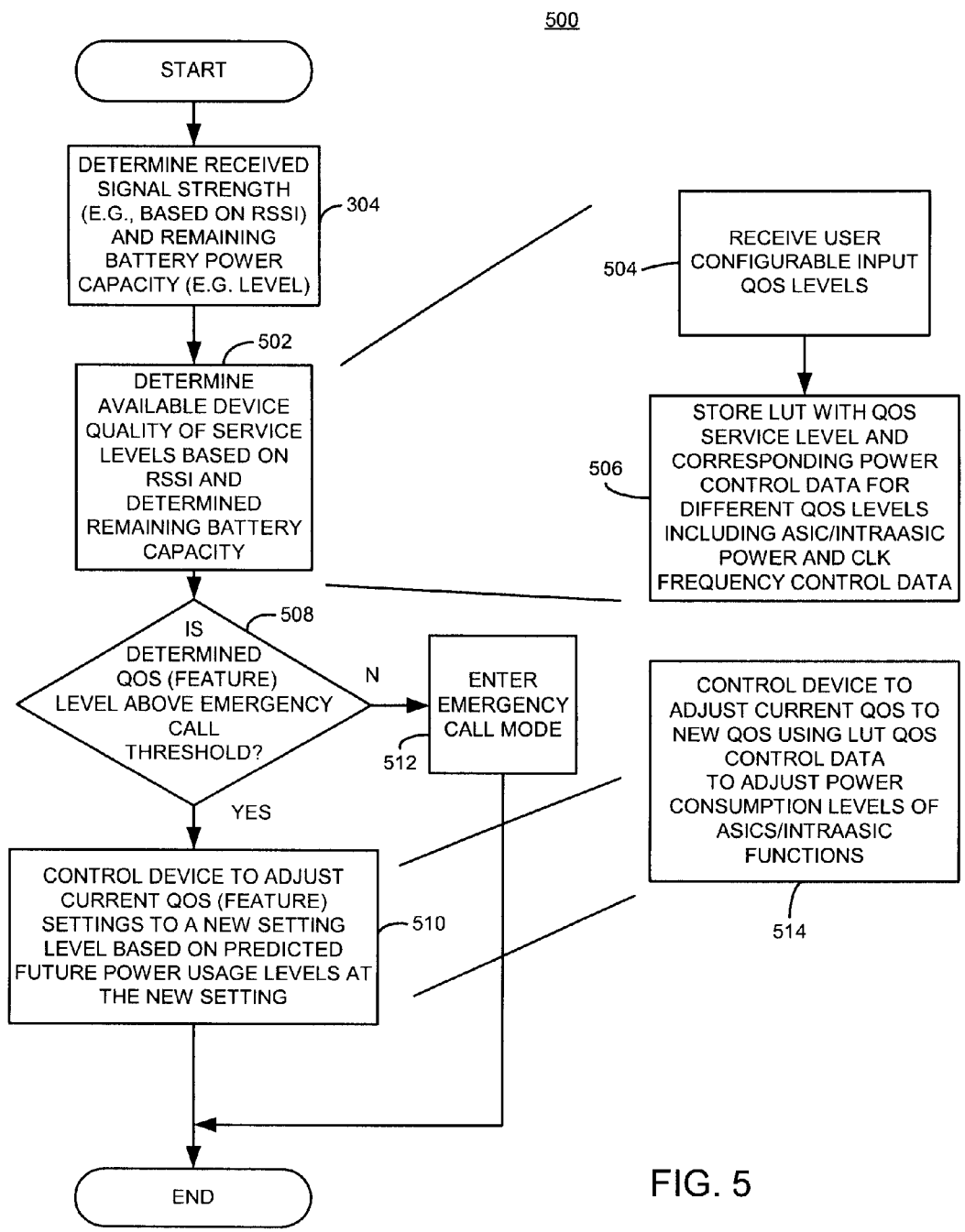
FIG. 5 is a flowchart illustrating one example of a method for dynamically controlling a functional processing capability feature of a portable device in accordance with one embodiment of the invention.

FIG. 5 illustrates one example of a method according to one embodiment of the invention that allows a user to reserve an emergency call period by setting, for example, an emergency call power threshold and control the device to dynamically control functional processing capability features of the device in a way that attempts to maximize the runtime of an application until the emergency call threshold is met.

Figure 9:
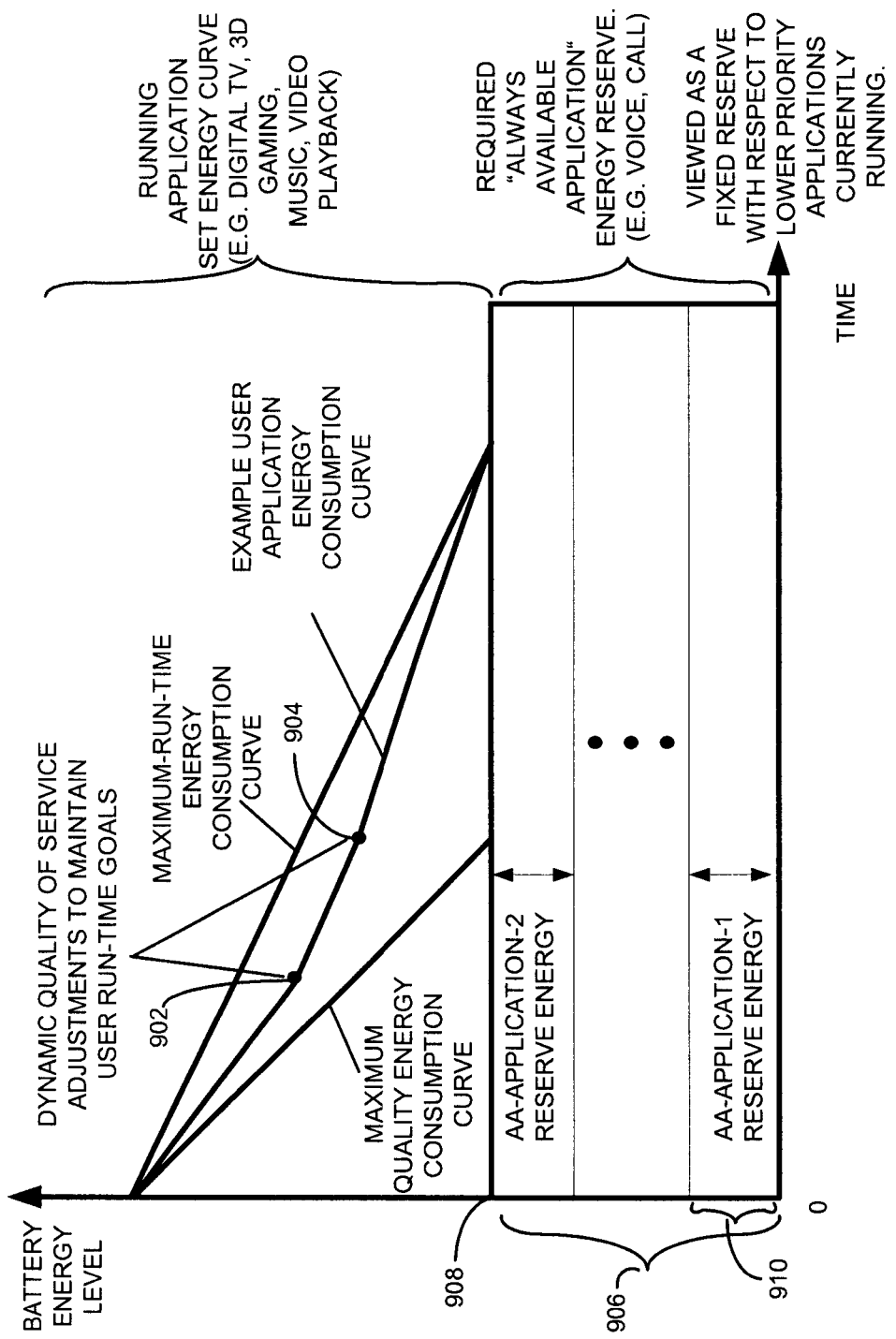
FIG. 9 is a diagram illustrating maximum quality energy consumption curves and maximum runtime energy consumption curves.

Referring also to FIG. 9, an application energy consumption versus time curve diagram illustrates dynamic functional processing capability feature adjustments (of which quality of service adjustments are one example) made by the controller 32 at set thresholds 902 and 904, such as the application runtime information 416 (see FIG. 4). The reserve battery energy level 906 may be used, for example, for voice calls. The available energy above this level may be used for playing games, using cameras or other features. However, once the battery energy level 908 is met, the controller 32 does not allow certain applications or features (e.g., a game application) to be executed. Instead, in this mode of operation controller 32 may only allow a voice mode to be activated. Within the battery level range 906 are further prioritization of applications. For example, the emergency call level 910 may be the highest priority level in that no other applications are allowed to run once this battery capacity level has been reached to allow the device at least to be used for emergency calls for safety reasons. Lesser priority levels may be set within battery level range 906 for other applications. For example, a e-mail communication application may have a lesser priority than the emergency call level 910 and a music play back application may have a priority level less than the e-mail communication application but more than exemplary game application priority level described above. In this exemplary embodiment, once battery energy level 908 is met or reached, the exemplary game application will be shut down stopping further game application play. As the battery energy level 908 transitions through to emergency call level 910 (as a result of battery power consumption), music playback application will be the next application shut down followed by the e-mail communication application. Thereby, upon reaching battery level 910 only voice communications will be able to be performed. It will be recognized that the device may be configured so that any suitable application or feature may serve as the highest priority feature. For example, one other mode might be "shut off everything NOT related to my game". For example, if a user is on a plane (or just don't want any calls) and wants to play a game or listen to music the user interface allows the user to select a mode to shut off the radio frequency portion of the phone and prioritize certain applications over the phone-call portion while optimizing battery life. Or if a map is downloaded to the phone and it is a high priority map (the only map available is the one on the phone), the user may not want the radio frequency transmitting portions on and consuming power since they may want the map to be available as highest priority.

Referring back to FIG. 5, the method 500 includes determining the received signal strength and remaining battery power capacity (as shown in block 304). As shown in block 502, the method includes determining the available device quality of service levels based on the RSSI and determined remaining battery capacity. This is shown in further detail by blocks 504 and 506. As shown this may include, for example, receiving the user configurable input quality of service levels through the graphic user interface 412. The user may set the quality of service levels on a per application basis or any suitable basis. This may include selecting a given application for a maximum available runtime or to instead maximize the quality of service irrespective of the amount of power it may consume. As such, the graphic user interface 412 is used to receive the user input and stores in a lookup table (or other suitable storage mechanism) the quality of service level and corresponding power control data for different quality of service levels on a per application basis or other suitable basis. The corresponding power control data may include, for example, the operational clock rates and supply voltage levels for given processing cores or application specific integrated circuits that are used by the application, such as one or more graphics processing cores if the application is a game. Any other suitable power control information may be used to reduce or increase power consumption for a given application. Although this example is described with reference to controlling power on a per application basis, it will be recognized that the power is controlled on any functional processing capability feature basis.

As shown in block 508, if the determined quality of service or functional processing capability feature utilizes power for a given runtime length that is above the emergency call threshold, meaning that there is enough power to both run the application at a quality of service setting as designated by the user, the method continues to block 510 to control the device to adjust the current quality of service setting to a new setting level based on predicted future power usage levels at the new setting. As such, if it is predicted that the desired quality of service level that is set by the user can only be maintained by, for example, increasing power usage then power settings are changed to meet the quality of service setting. However, as shown in block 512, if the quality of service feature that has been selected and the amount of power to meet that quality of service level is not available in comparison to an emergency call threshold, the device will enter the emergency call mode and effectively shut down all applications to reserve remaining power for voice communications (e.g., emergency calls), should one need to be made. As such, the controller can shut down functional processing capability features of the wireless device to reduce power consumption to preserve power for an emergency call. The controller 32, or processor that provides the GUI, when it receives the user configurable input quality of service levels through the graphic user interface, stores the configuration information as functional processing capability feature setting data that includes, for example, clock settings and/or associated voltage level settings for circuits within the device as required to meet a given quality of service setting.

Also, in one example, to effect a functional processing capability feature, when the device is in an emergency call mode, the controller reduces the display capability of the wireless device by shutting down one of multiple displays or uses a smaller display portion of a single display during the emergency call mode to conserve power. As such, the functional processing capability of the device is changed since it need only process data for a display in a smaller portion of a screen or output to a single display instead of multiple displays. Block 514 shows in more detail one example of controlling the device to adjust functional processing capability features that use a lookup table that contains the settings for the device such as register settings that define clock frequencies and power supply voltage level settings, for example, for various circuits within the device are stored in a lookup table. To adjust the power consumption level of, for example, a particular processing core or portions within a processing core, these values are written to control registers for the various circuits. This control is based on both remaining battery capacity and a received signal strength indication as noted above. It will be recognized that the operation can be changed to allow a user to de-select an emergency power mode so that a game can be played or other feature can be used if desired.

Figure 6:
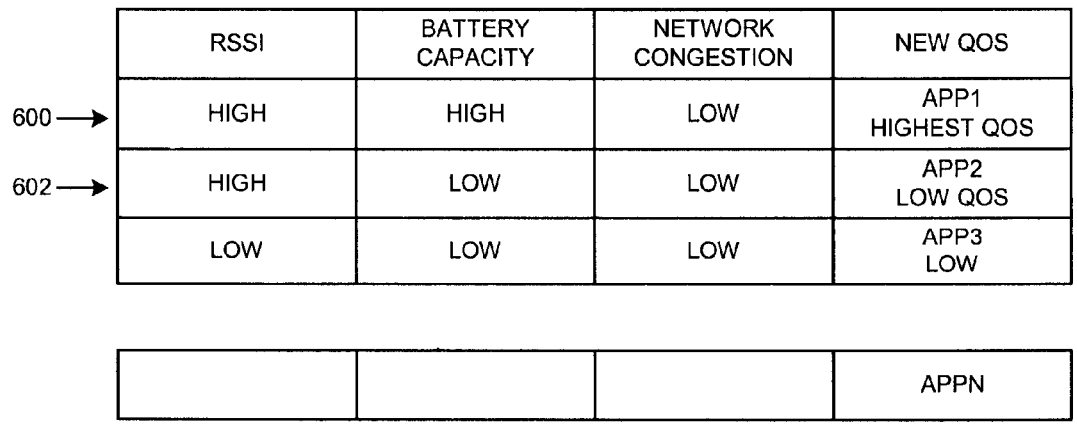
FIG. 6 is a block diagram illustrating data used to provide a new functional processing capability feature level, such as a new quality of service level in accordance with one embodiment of the invention.

FIG. 6 is a block diagram illustrating one example of functional processing capability feature setting data. On a dynamic basis, such as multiple times per second or any other suitable period, the controller 32 samples the RSSI information 406 and also determines the battery capacity level. As shown 6 for a setting 600 where the received signal strength indication is high and the battery capacity is determined to be high, and network congestion information 410 indicates that there is low network congestion, a new quality of service setting or functional processing capability feature level for application 1 is set to the highest of quality service level for that application. Another table can be used that has the specific clock frequency settings, supply voltage settings or other control settings. When conditions change such as where the received signal strength is still high is shown by settings 602, but the battery capacity is decreased to a low level. A different application, shown as App. 2, may be set to a low quality service level so that for example a game that is being played if it is determined to be App. 2 may operate in a lower quality manner by the controller 32 causing a frame rate change from 30 frames per second being output to 15 frames per second being output, or may change a graphics resolution level so that the graphics images are less clear which may take less processing capacity to create and hence less current draw to save power since the battery capacity is low. As such, as shown in this particular example, received signal strength, battery capacity and network congestion information is used to determine the functional processing capability feature level for a particular application. In another example, if the network congestion is high and the signal strength level is low, the device may need to increase power consumption for the application that controls voice communication to output a higher transmit signal level in an attempt to provide a necessary level of communication with the network. This may be done at the expense of another application which may be shut off to allow the voice application to take priority. Alternatively, the device may enter a reduced power mode in response to the network congestion information indicating that a decrease in network congestion has occurred since this may indicate that it may take less power to transmit a signal in a lower network congestion situation. Other functional processing capability features of the device may also be controlled based on network congestion, received signal strength and battery capacity.

Figure 7:
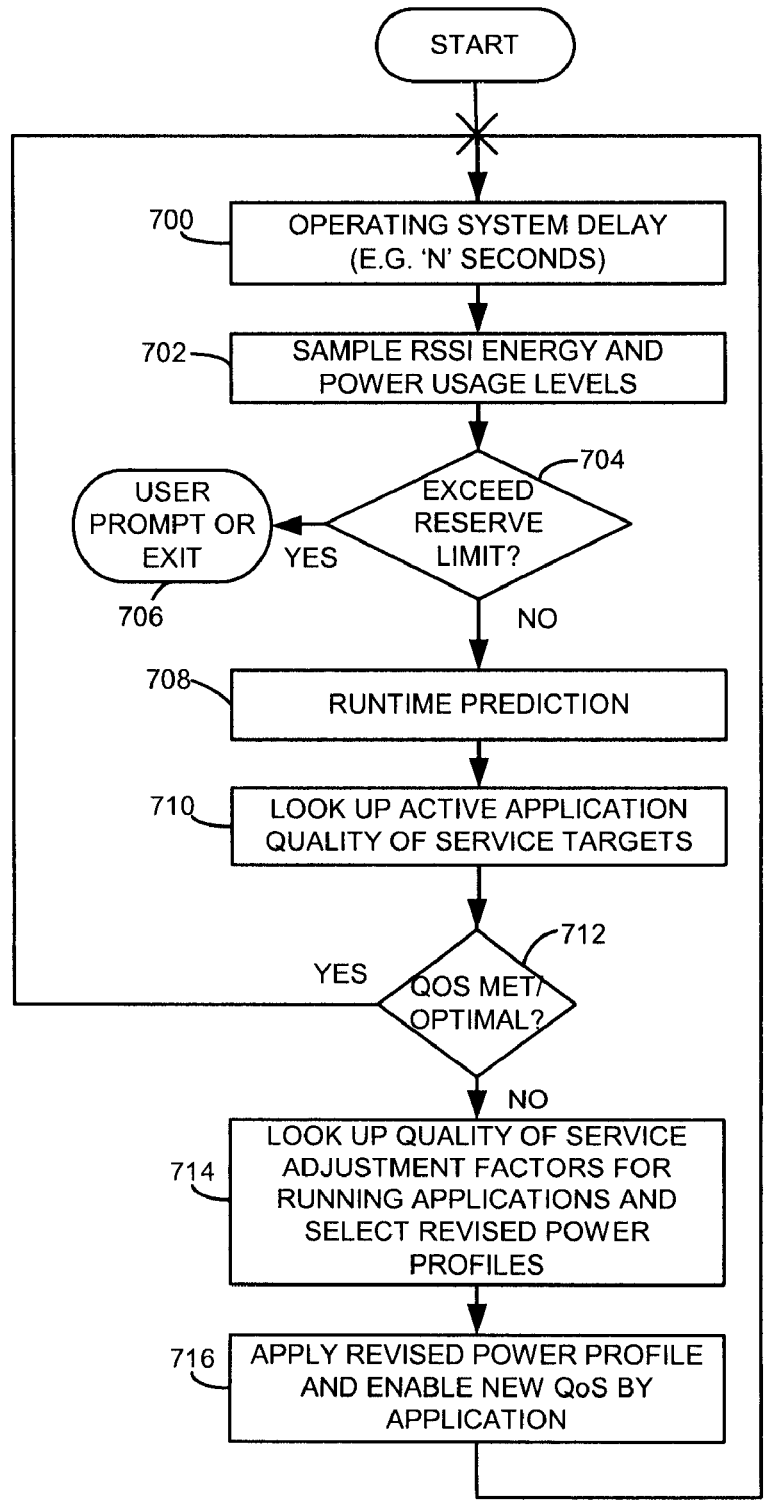
FIG. 7 is a table illustrating examples of quality of service settings based on priority definitions in accordance with one embodiment of the invention.

FIG. 7 is a flowchart illustrating another example of a method of dynamically controlling a functional processing capability feature of a portable device in accordance with one embodiment to the invention. As shown in block 700, the method includes controlling the sample rate of an RSSI/signal energy check to occur periodically as desired such as every few seconds or other suitable period. As shown in block 702, the method includes sampling an RSSI energy and current power usage levels of the device. As shown in block 704, the method includes determining if the reserved energy level (see FIG. 9) has been exceeded. This may be done for example by determining the current battery capacity and determining from the power usage levels of the device if the battery capacity level will fall below the reserve energy level. If so, as shown in block 706, the method includes notifying a user or exiting the application. However, as shown in block 704 if the reserve time is not exceeded, the method includes predicting how long a particular application can run at the current power usage level based on a current quality of service setting at which the application is operating 708. As shown in block 710, the method includes sampling the current power being consumed by the current application setting and also setting a quality of service target for the application. As such, block 710 refers to looking up the QoS Target for the "Working Set" (or active set) of running applications for the comparison in block 712. Run-length is a QoS target—if it is not met in as shown in block 712, then adjustments are made as shown in blocks 714 and 716 to accommodate this and try to extend run-time. For example, as shown in block 712, the method includes determining whether the quality of service that was set has met an optimal quality of services as desired by the user. This is done using FIG. 6, and the another table containing desired clock frequency settings and/or power supply voltage settings as noted above. Inputs 418, 420 sampled as shown in block 710 are used to guide the adjustment.

If the quality of service setting is already at an optimal setting, the method begins over again. However, if the quality of service does not meet the optimal quality of services level, the method includes, as shown in block 714, looking up the quality of service adjustment factors in a look-up table for the current running applications and selecting revised power profiles for each of the applications based on the information in the look-up table. By way of example, the look-up table may include the information shown in FIG. 6 as well as additional information as to how to set circuits or functional blocks of the device to change power consumption levels of the various applications to allow a quality of service to be met for a higher priority application. For example, if the priority application is a game being executed, and another application such as a camera application is active, the camera application can be controlled so that a lower quality resolution image is taken by the camera to provide enough power to run the game at a higher quality resolution level. As shown in block 716, the method includes applying the revised power profile which may include for example setting suitable register settings to control clock frequencies of circuits or supply voltages of circuits as known in the art to enable the new quality of service to be provided by the application.

Figure 10:
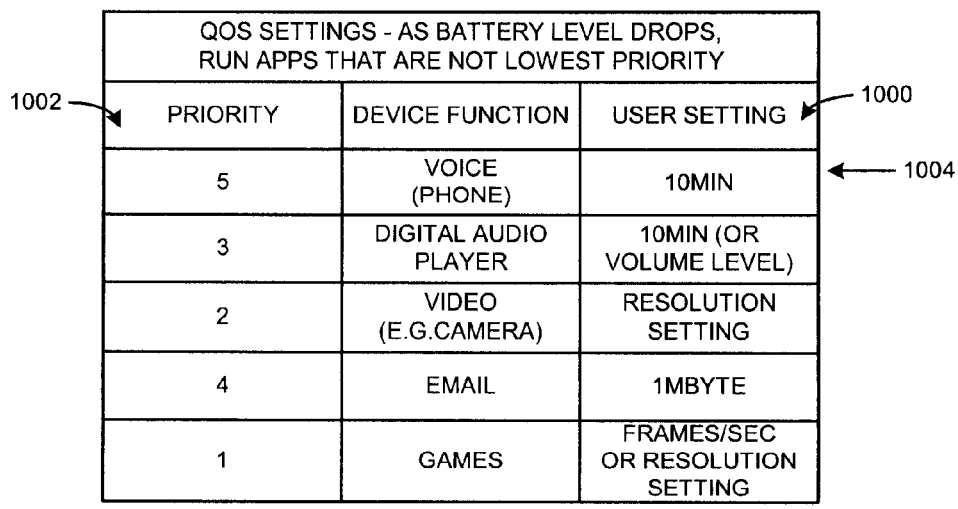
FIG. 10 is a flowchart illustrating one example of a method for dynamically controlling a functional processing capability feature of a portable device in accordance with one embodiment of the invention.

FIG. 8 illustrates another method for dynamically controlling operation of a device to provide power savings. Unlike the processes described above, no received signal strength indication is necessary. This method may also be carried out by the controller 32 or any other suitable structure. As shown in block 800, the method includes determining remaining power capacity of the battery. As shown in block 802, the method includes determining a power consumption level of the device such as by determining the current power used by the elements of the device and based on user or otherwise prioritized functional process capability features, and in response to the remaining power capacity of the battery and the power consumption rate of the portable device, dynamically controlling the device as shown in 804. The operation of the device is based on user feature priority settings to provide power to run higher priority features at the expense of a lower priority functional processing capability feature consistent with the user prioritized functional processing capability features. The method may also include obtaining data representing user prioritized functional processing capability features such as from a storage location in the device, but can be received wirelessly by the device from the network or other wireless device. In this example, a user, through a graphical user interface, or any other suitable interface can classify applications that are available on the portable device as being higher priority or lower priority as illustrated for example in FIG. 10. In this example, as the battery level drops, the device runs applications that are of a higher priority while terminating or not allowing execution of lower priority applications. A user may also configure how much battery power to reserve for critical applications such as for emergency 911 calls, or other suitable operations. The graphical user interface 412 can also provide data that allows the user to specify an action to be taken once the battery power level has dropped to a threshold level. For example, a user may choose to disable a use of a non-critical applications or allow the device to instead provide a warning to the user that the threshold has been reached.

By was of illustration, through a user interface, the user may set for example the priority level for a given device function so that user settings 1000 may be entered through a graphic user interface. The graphic user interface may also for example allow the user to set the priority level 1002 of the various device functions (also referred to as applications). In this example, the voice or phone function has been set at the highest priority and the user setting is for ten minutes as shown by quality of service settings 1004 so that the device will attempt to allow at least a minimum of 10 minutes of talk time as the priority. As the power capacity of the device battery decreases, lower priority functions are either shut down or the quality of service of a feature is reduced in an attempt to conserve battery power. In this example, a digital audio player play time is set for 10 minutes (and/or a volume level can be set) the resolution of the video, such as from a camera or video playback circuit such as an MPEG decoder may be set, the e-mail application may be set to allow only one megabyte of e-mail data to be received or just headers to be received and, for device functions such as games, the frames per second of output resolution on a display may be set to a particular setting. As such the prioritized features 1004 may include data that represents a talk time threshold, such as 10 minutes and the controller 32 dynamically controls the functional process capability features of the device to provide power for a voice communication feature at the expense of a lower priority feature, such as a game playing feature, consistent with the talk time threshold as the remaining power capacity of the battery decreases. The controller 32, in response to the remaining power capacity of the battery, a power consumption rate of the portable device and user prioritized functional processing capability features, dynamically controls the functional processing capability features to provide power for a higher priority feature at the expense of a lower priority functional processing capability feature consistent with the user prioritized information.

Figure 11:
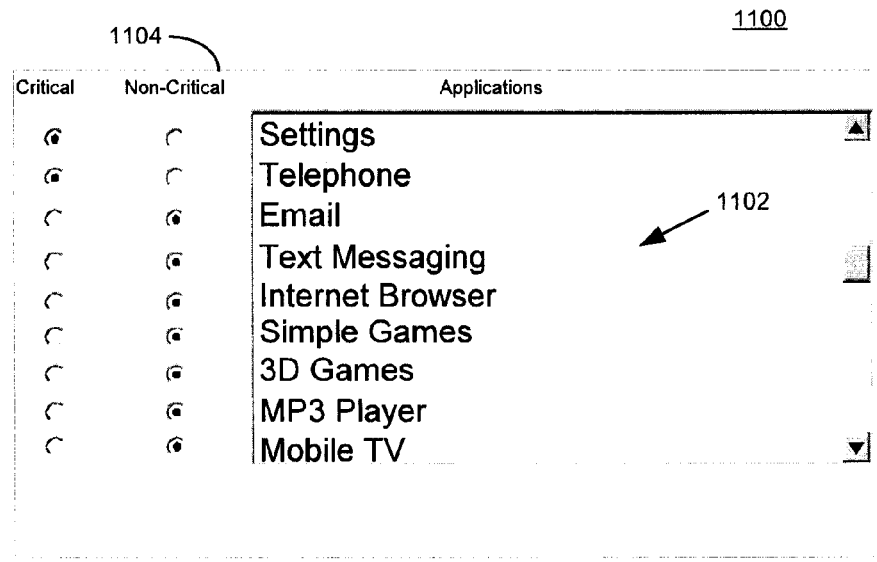
FIG. 11 diagrammatically illustrates one example of a user interface in accordance with one embodiment of the invention.

FIG. 11 illustrates one example of a graphic user interface 1100 that provides selectable priority information shown as "critical" or "noncritical" for various applications (e.g., functional processing capability features) of the device shown as 1102. As such, the user interface 1100 provides selectable functional processing capability feature priority data 1104 when selected, provides the selected feature priority dated to memory for storage as the data representing the user prioritized functional processing capability features.

Figure 12:
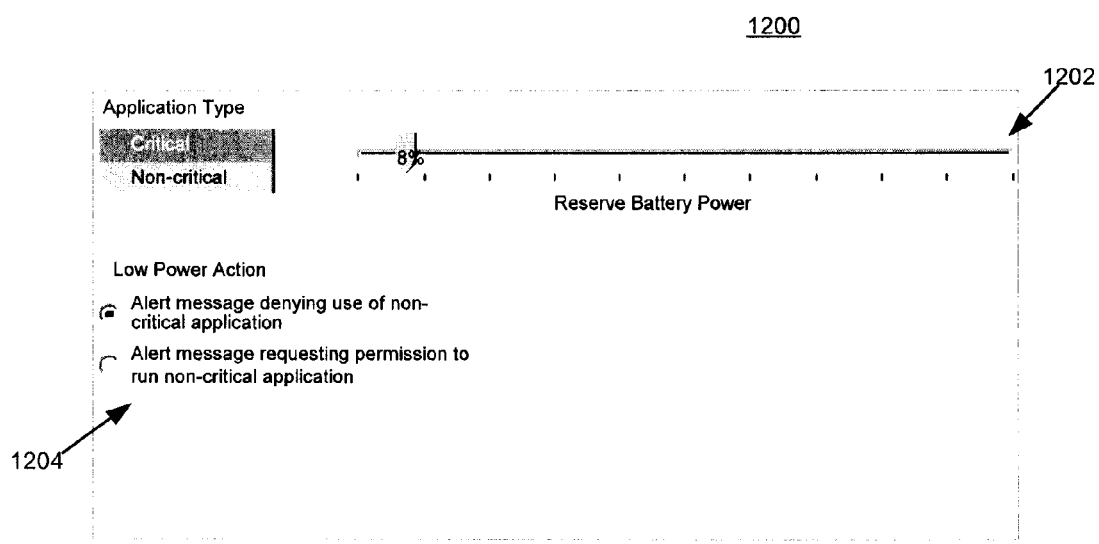
FIG. 12 diagrammatically illustrates one example of a user interface in accordance with one embodiment of the invention.

FIG. 12 illustrates another example of another portion of the graphic user interface 1200 that indicates for a high priority application type, the user is able to set the reserve battery power level as a percentage of total battery power as shown by the graphic 1202. The graphic user interface 1200 also provides selectable notification information 1204 to allow the user to select whether to provide an alert message that denies use of noncritical application or a message requesting permission to run a noncritical application.

Figures 13, 14:
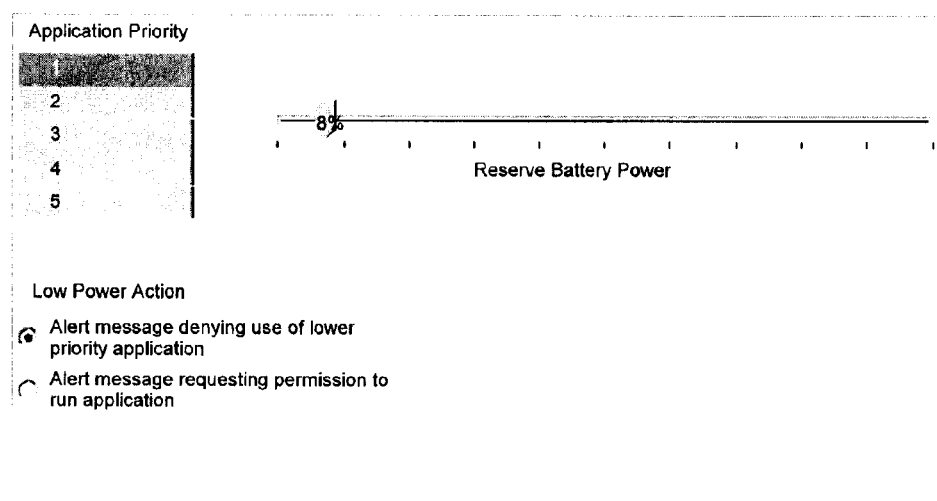
FIG. 13 diagrammatically illustrates one example of a user interface in accordance with one embodiment of the invention.
FIG. 14 diagrammatically illustrates one example of a user interface in accordance with one embodiment of the invention.

FIG. 13 illustrates another example of a graphic user interface 1300 that provides feature priority data but in a more prioritized manner to allow, for example, five priority settings per application. FIG. 14 illustrates a graphic user interface 1400 for providing selectability of reserve battery power levels for a given application priority setting.

If desired, the method may also include dynamically controlling operation of the device based on the priority information, based on the battery capacity and based on received signal strength information. For example, if the received signal strength information indicates that the signal strength is decreasing, the controller 32 may shut off a lower priority application to allow additional power to be used for a higher transmit power during the high priority voice operation. Other control techniques will be recognized by one of ordinary skill in the art.

As shown in FIGS. 13 and 14 a user can reserve battery power based on priority. Using a graphical user interface, such as a control panel, the user reserves battery power based on application priority. For example, priority 1 applications can reserve 20% battery power. When the battery power has been drained to this level, only priority 1 applications are used. Priority 2 applications may be configured to require 40% battery power and when there is greater than 40% battery power, priority 2 or higher applications are allowed to be run.

Figure 15:
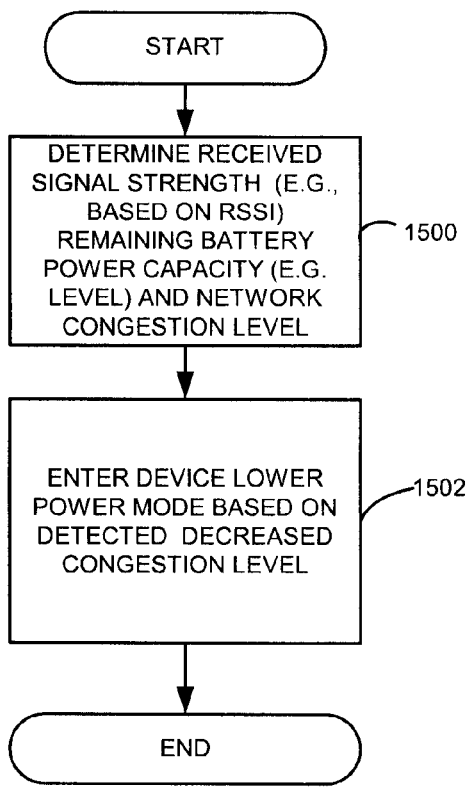
FIG. 15 is a block diagram illustrating one example of a method for controlling power consumption of a portable device in accordance with one embodiment of the invention.

FIG. 15 illustrates another method for providing power control in a portable device which also takes into account network congestion level as previously described with reference to FIG. 6. As shown in block 1500, the method may include continuing to receive signal strength information and remaining battery power capacity along with the network congestion level information. As shown in block 1502, the method includes entering a lower power mode of the device based on the detected decreased congestion level. For example, if the network congestion level has gone down since the last assessment, the device under control of the controller, enters into a low power mode since less transmit power is required and the device can go into a power saving mode as desired.

Figure 16:
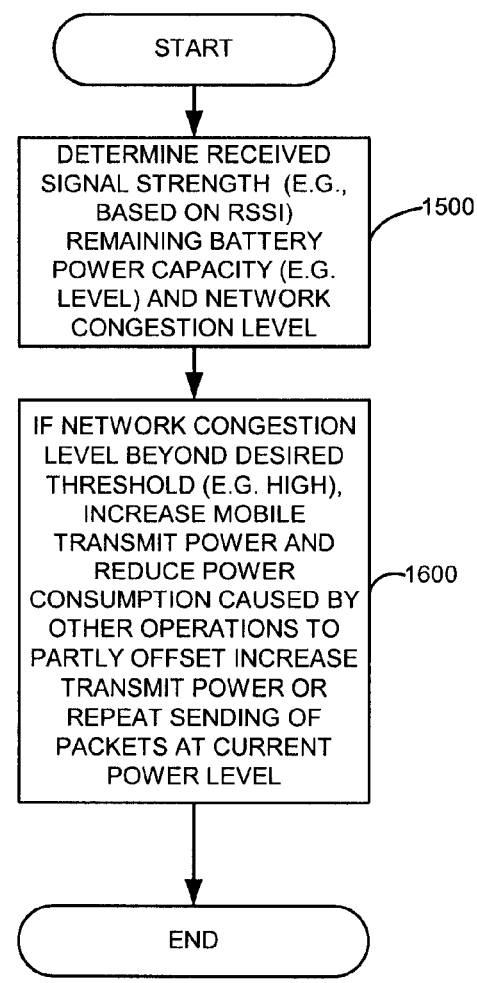
FIG. 16 is a block diagram illustrating one example of a method for controlling power consumption of a portable device in accordance with one embodiment of the invention.

FIG. 16 illustrates another method that includes as shown in block 1600, if the network congestion levels is beyond the desired threshold such as indicating that the network congestion level has increased, the controller causes an increase in the signal transmit power of the device and reduced power consumption is caused by the decrease in other feature capabilities to partly offset the increase in transmit power. Alternatively, a controller repeatedly sends packets at current power levels based on the indication that the remaining battery capacity is at a suitable level and the network congestion level has increased, for example. Alternatively, where there is high network congestion, the network may signal the portable device indicating a high congestion condition and the information, in addition to the received signal strength indication and battery capacity, is used to trigger a lower power mode for the device since the device does not attempt to send data during high network congestion since the likelihood of a successful transmission is lower.

As noted above, among other advantages, the user may prioritize applications or operations of other features of the portable device and based on the users need for a specific amount of talk time or runtime of an application, the controller calculates the power consumption of the desired feature alone or in combination with signal strength. Based on this assessment the device may turn those features or applications off as required to meet the talk time or runtime setting or may suitably reduce the quality of service of an application to meet the runtime requirements. In addition, reserve power may be maintained if desired and during the reserve time only basic operation of the device may be employed to conserve power for emergency calls or other operations. Other advantages will be recognized by those of ordinary skill in the art.

The above detailed description of the invention and the examples described therein have been presented for the purposes of illustration and description only and not by limitation. It is therefore contemplated that the present invention cover any and all modifications, variations or equivalents that fall within the spirit and scope of the basic underlying principles disclosed above and claimed herein.

What is claimed is:

1. A portable device comprising:
a battery; and
a controller, operatively coupled to the battery, and responsive to (i) a remaining power capacity of a battery, (ii) a power consumption rate of the portable device and (iii) received signal strength information, and wherein the controller, based on priority information about functional processing capability features of the portable device, dynamically controls the functional processing capability features of the device to provide power for higher priority features at the expense of lower priority functional processing capability features consistent with the priority information, wherein the priority information comprises an assigned priority level for each of the functional processing capability features, and wherein dynamically controlling the functional processing capability features comprises increasing transmit power in response to detecting a signal strength below a threshold and reducing power consumed by an application to at least partly offset the increased transmit power.

2. The portable device of claim 1 further comprising data representing a talk time threshold and wherein the controller is operative to dynamically control the functional processing capability features of the device to provide power for a voice communication feature at the expense of a lower priority feature consistent with the talk time threshold as the power capacity of the battery decreases.

3. The portable device of claim 1, further comprising a memory and a user interface operative to provide selectable functional processing capability feature priority data and to provide selected feature priority data to the memory for storage as the priority information.

4. The portable device of claim 1, wherein the assigned priority level for a particular functional processing capability feature is selected from at least three possible priority levels.

5. A wireless portable device comprising:
a wireless signal strength determinator operative to determine a received signal strength of the portable device; and
a controller, operatively coupled to the wireless signal strength determinator, and operative to adjust functional processing capability features of the wireless portable device based on the determined received signal strength, battery capacity information, and priority information about the functional processing capability features, wherein the priority information comprises an assigned priority level for each of the functional processing capability features, and wherein adjusting the functional processing capability features comprises increasing transmit power in response to detecting a signal strength below a threshold and reducing power consumed by an application to at least partly offset the increased transmit power.

6. The wireless device of claim 5, wherein adjusting the functional processing capability features of the device comprises controlling, at an application level, operation of applications operating on the device based on the determined received signal strength, the battery capacity information, and the priority information.

7. The wireless device of claim 5, further comprising:
a battery; and
a battery capacity determinator operatively coupled to the battery and operative to generate the battery capacity information based on a remaining battery capacity of the battery.

8. The wireless device of claim 5, wherein adjusting the functional processing capability features of the device comprises selecting which applications will operate on the device based on the determined received signal strength, the battery capacity information, and the priority information.

9. The wireless device of claim 5, further comprising a user interface operative to provide a user settable talk time threshold, and wherein the controller is operative to set the functional processing capability features based on the user settable talk time threshold to preserve a desired talk time indicated by the user settable talk time threshold.

10. The wireless device of claim 5, wherein the controller is operative to determine an amount of power that will be used to provide at least one of the functional processing capability features and is operative to reduce at least one of the functional processing capability features to preserve power for an emergency call.

11. The wireless device of claim 10, wherein the controller is operative to shut down at least one of the functional processing capability features of the wireless device to reduce power consumption to preserve power for the emergency call.

12. The wireless device of claim 5, further comprising memory, operatively coupled to the controller, that stores data representing functional processing capability feature setting data.

13. The wireless device of claim 11 wherein the controller reduces display capability of the wireless device when in an emergency call mode.

14. The wireless portable device of claim 5, wherein adjusting the functional processing capability features of the wireless portable device comprises adjusting quality of service of an application that is not used for voice communication based on the determined received signal strength, the battery capacity information, and the priority information.

15. A portable device comprising:
a wireless signal strength determinator operative to determine a received signal strength of the wireless device; and
a controller, operatively coupled to the wireless signal strength determinator, operative to adjust functional processing capability features of the wireless device based on the determined received signal strength, battery capacity information, network congestion information, and priority information about the functional processing capability features, wherein the priority information comprises an assigned priority level for each of the functional processing capability features, and wherein adjusting the functional processing capability features comprises increasing transmit power in response to detecting a signal strength below a threshold and reducing power consumed by an application to at least partly offset the increased transmit power.

16. The wireless device of claim 15, further comprising a wireless receiver operative to receive the network congestion information from a wireless network communication signal.

17. The wireless device of claim 15, wherein adjusting the functional processing capability features of the device comprises controlling, at an application level, operation of applications operating on the device based on the determined received signal strength, the battery capacity information, the network congestion information, and the priority information.

18. The wireless device of claim 15, further comprising:
a battery; and
a battery capacity determinator operatively coupled to the battery and operative to generate the battery capacity information based on a remaining battery capacity of the battery.

19. The wireless device of claim 15, wherein adjusting the functional processing capability features of the device comprises selecting which applications will operate on the device based on the determined received signal strength, the battery capacity information, the network congestion information, and the priority information.

20. The wireless device of claim 15, further comprising a user interface operative to provide a user settable talk time threshold, and wherein the controller is operative to set the functional processing capability features based on the user settable talk time threshold to preserve a desired talk time indicated by the user settable talk time threshold.

21. The wireless device of claim 15 wherein the controller is operative to determine an amount of power that will be used to provide at least one of the functional processing capability features and is operative to enter an emergency call mode prior to an out of power condition, to preserve power for an emergency call.

22. The wireless device of claim 21 wherein the controller is operative to shut down at least one of the functional processing capability features of the wireless device to reduce power consumption to preserve power for the emergency call.

23. The wireless device of claim 15, further comprising memory, operatively coupled to the controller, that stores data representing functional processing capability feature setting data.

24. The wireless device of claim 22 wherein the controller reduces display capability of the wireless device when in an emergency call mode.

25. A method comprising:
obtaining, by a portable device, priority information about functional processing capability features of the portable device, wherein the priority information comprises an assigned priority level for each of the functional processing capability features; and
based on the priority information and in response to a remaining power capacity of a battery in the device, a power consumption rate of the portable device and received signal strength information, dynamically controlling, by the portable device, the functional processing capability features of the device to provide power for higher priority functional processing capability features at the expense of lower priority functional processing capability features consistent with the priority information, wherein dynamically controlling the functional processing capability features comprises increasing transmit power in response to detecting a signal strength below a threshold and reducing power consumed by an application to at least partly offset the increased transmit power.

26. The method of claim 25, wherein the portable device comprises data representing a talk time threshold and wherein the method includes dynamically controlling the functional processing capability features of the device to provide power for a voice communication feature at the expense of a lower priority functional processing capability feature consistent with the talk time threshold as the power capacity of the battery decreases.

27. The method of claim 25, further comprising providing selectable functional processing capability feature priority data and storing data in memory representing selected user prioritized functional processing capability features.

28. A method comprising:
determining, by a portable device, a received signal strength for the portable device; and
adjusting, by the portable device, functional processing capability features of the portable device based on the determined received signal strength, battery capacity information, and priority information about the functional processing capability features, wherein the priority information comprises an assigned priority level for each of the functional processing capability features, and wherein adjusting the functional processing capability features comprises increasing transmit power in response to detecting a signal strength below a threshold and reducing power consumed by an application to at least partly offset the increased transmit power.

29. The method of claim 28, wherein adjusting the functional processing capability features of the device comprises controlling, at an application level, operation of applications operating on the device based on the determined received signal strength, the battery capacity information, and the priority information.

30. The method of claim 28, wherein adjusting the functional processing capability features of the device comprises selecting which applications will operate on the device based on the determined received signal strength, the battery capacity information, and the priority information.

31. The method of claim 28, further comprising using a user settable talk time threshold and setting the functional processing capability features based on the user settable talk time threshold to in an effort to preserve a desired talk time indicated by the user settable talk time threshold.

32. The method of claim 28, further comprising determining an amount of power that will be used to provide at least one of the functional processing capability features, and reducing at least one of the functional processing capability features to preserve power for an emergency call.

33. The method of claim 32, further comprising shutting down at least one of the functional processing capability features of the wireless device to reduce power consumption to preserve power for the emergency call.

34. The method of claim 32, further comprising reducing display capability of the wireless device when in an emergency call mode.

35. The method of claim 28, wherein the adjusting of the functional processing capability features of the portable device is also based on network congestion information.

36. The method of claim 35, further comprising causing the portable device to enter a reduced power mode in response to the network congestion information indicating a decrease in network congestion.

37. The method of claim 35, further comprising determining if the network congestion information indicates a network congestion level at or beyond a desired high level threshold and if so, increasing signal transmit power of the portable device and reducing power consumption caused by other features, to partly offset the additional power consumption caused by the increase in transmit power.

38. The method of claim 35, further comprising determining if the network congestion information indicates a network congestion level at or beyond a desired high level threshold and if so, repeating a sending of packets at a current power level.

39. The method of claim 28, further comprising determining a power usage rate of the device based on a current operational condition of the device, predicting an amount of time that an application can continue to run based on the power usage rate; determining whether a desired application quality of service level can be maintained for a desired application run-time; if not, adjusting at least one of power consumption of the device and a quality of service level provided by the application in an attempt to meet the desired application run-time.

40. The method of claim 39, wherein adjusting at least one of the power consumption of the device and the quality of service level provided by the application comprises shutting down the application to maintain a minimum battery power energy reserve.

41. An apparatus, comprising:
means for obtaining priority information about functional processing capability features of a portable device, wherein the priority information comprises an assigned priority level for each of the functional processing capability features; and
means for dynamically controlling the functional processing capability features of the portable device based on the priority information, a remaining power capacity of a battery in the portable device, a power consumption rate of the portable device and received signal strength information, wherein the dynamic control of the functional processing capability features provides power for higher priority functional processing capability features at the expense of lower priority functional processing capability features consistent with the priority information, and wherein dynamically controlling the functional processing capability features comprises increasing transmit power in response to detecting a signal strength below a threshold and reducing power consumed by an application to at least partly offset the increased transmit power.

42. A non-transitory computer-readable medium comprising instructions that are executable to:
obtain priority information about functional processing capability features of a portable device, wherein the priority information comprises an assigned priority level for each of the functional processing capability features; and
dynamically control the functional processing capability features of the portable device based on the priority information, a remaining power capacity of a battery in the portable device, a power consumption rate of the portable device and received signal strength information, wherein the dynamic control of the functional processing capability features provides power for higher priority functional processing capability features at the expense of lower priority functional processing capability features consistent with the priority information, and wherein dynamically controlling the functional processing capability features comprises increasing transmit power in response to detecting a signal strength below a threshold and reducing power consumed by an application to at least partly offset the increased transmit power.

* * * * *